United States Patent [19]

Sung et al.

[11] Patent Number: 5,681,538
[45] Date of Patent: Oct. 28, 1997

[54] METALLIC MONOLITH AND PLATES FOR THE ASSEMBLY THEREOF

[75] Inventors: Shiang Sung, New York, N.Y.; John K. Hochmuth, Bridgewater, N.J.

[73] Assignee: Engelhard Corporation, Iselin, N.J.

[21] Appl. No.: 381,804

[22] Filed: Feb. 1, 1995

[51] Int. Cl.[6] ........................................... B01J 35/04
[52] U.S. Cl. ................................. 422/211; 165/166
[58] Field of Search ........................ 422/211; 165/166

[56] References Cited

U.S. PATENT DOCUMENTS

| | | |
|---|---|---|
| 3,067,002 | 12/1962 | Reid, Jr. et al. . |
| 4,527,622 | 7/1985 | Weber ............................. 165/166 |
| 4,719,970 | 1/1988 | Fayolle ............................ 165/166 |
| 4,848,450 | 7/1989 | Lapkowsky ................... 165/166 |
| 5,072,790 | 12/1991 | Lapowsky ...................... 165/166 |
| 5,158,753 | 10/1992 | Take et al. . |
| 5,303,547 | 4/1994 | Meiville et al. . |
| 5,316,628 | 5/1994 | Collin et al. .................. 165/166 |

FOREIGN PATENT DOCUMENTS

| | | |
|---|---|---|
| 0592713 | 4/1994 | European Pat. Off. . |
| 360 058 | 12/1980 | Germany . |

*Primary Examiner*—Timothy McMahon
*Attorney, Agent, or Firm*—R. A. Negin

[57] ABSTRACT

A monolith suitable for use as a heat exchanger or as a carrier for a catalyst member is assembled from a plurality of plates (10, 10', 410) that are mounted one atop the next. The plates are generally rectangular and define a central baffle portion (12, 412) having a pair of substantially straight, parallel sides (14, 414) and having attached to the baffle portion at the ends thereof a support flange (18, 418) which is bendable upward into a configuration that enables it to support a second plate in spaced, parallel relation to the first plate, and anchor flanges (20, 420) that are bendable downward, to seal the corners of the monolith and, optionally, to engage the support flanges of one or more underlying plates.

15 Claims, 11 Drawing Sheets

METALLIC MONOLITH AND PLATES FOR THE ASSEMBLY THEREOF

BACKGROUND OF THE INVENTION

1. Field of the Invention

This invention relates to the construction of metallic heat exchangers and monoliths, and more particularly to the configuration of plates used for constructing such devices.

Metallic articles comprising a plurality of plenums have long been used as heat exchangers to transfer heat between gas streams. A variety of methods are known for constructing such heat exchangers, which in general comprise at least a first plurality of conduits or ducts through which a first gas stream may be flowed. In a typical heat exchanger according to the prior art, the first plurality of ducts provided by heat exchange tubes runs through the cross-sectional flow area of at least one larger duct, so that a second gas stream passing through the larger duct flows around and in contact with the heat exchange tubes, so that heat may be exchanged between the first and second gas streams through the metallic tubes.

SUMMARY OF THE INVENTION

In general, the present invention provides plates for the assembly of a monolith suitable for use as a heat exchanger or as a carrier for a catalyst member, and monoliths comprising plates according to the present invention.

Specifically, the present invention provides a first plate used in the assembly of a monolith, the first plate comprising a central baffle portion having two sides and two ends, a support flange attached to each end of the first plate for supporting a succeeding plate in parallel, spaced relation to the first plate, and anchor flanges attached to each end of the first plate for closing off the corners of a monolith comprising the plate. According to one embodiment of the invention, each support flange may comprise a riser portion having two sides and being attached on one side to an end of the baffle portion, and a landing portion attached to the other side of the riser portion. In addition, each anchor flange may extend from the baffle portion for a length equal to at least twice the width of the riser portion.

According to another aspect of the present invention, each anchor flange may comprise a leg portion and a riser-engaging tab extending from the leg portion in a direction perpendicular to the side of the plate for engaging the riser portion of a preceding plate support flange on which the first plate may be mounted.

According to another aspect of the invention, the plate may further comprise a sub-riser-engaging tab attached to the leg portion and extending therefrom, for engaging the riser portion of the support flange of a second preceding plate, on which the first preceding plate is mounted.

In a particular embodiment, a bendable firsplate used in the assembly of a monolith may comprise, when in its flat configuration, a generally rectangular central baffle portion having a width defined by a pair of generally straight, parallel side edges and being mounted on the ends by a flange border. There may be a support flange at each end of the baffle portion, each support flange comprising a riser portion and a landing portion. The riser portion has two sides and two ends and is attached on one side to the baffle portion at the flange border, and is bendable to a substantially perpendicular relationship with the baffle portion. The landing portion is attached to the other side of the riser portion and is bendable to be substantially parallel to the baffle portion, for supporting a succeeding plate configured like the first plate. The length of the riser portion is less than the width of the baffle portion. The riser portion may be disposed centrally between the side edges of the baffle portion. In this embodiment, a pair of anchor flanges is attached to each end of the baffle portion, beside each end of the riser portions. Each anchor flange is contiguous with the support flange, and is bendable to a substantially perpendicular relationship with the baffle portion in a direction opposite to that of the riser portion. The anchor flange has a width equal to about one-half the difference between the end-to-end length of the riser portion and the width of the baffle portion, and so when bent downward can at least partially close off the corner of a monolith comprising the plate. The anchor flange may comprise a leg portion for at least partially closing off the corner of a monolith comprising the plate and may optionally further comprise a riser-engaging tab. The riser-engaging tab is attached to and extends from the leg portion away from the riser portion, and has a width not greater than the width of the riser portion. The riser-engaging tab has a length greater than the width of the leg portion, for engaging the riser portion of a preceding plate configured like the first plate, on which the first plate is mounted.

According to a specific embodiment of the invention, the width W of the baffle portion may exceed the length R of each riser portion by an amount designated 2T, and the width of each leg portion may equal T. Further, the width W of the baffle portion may exceed the length D of the baffle portion by an amount designated 2S, and the width of each riser portion may equal S.

According to another aspect of the invention, the leg portion may have a length greater than twice the width of the riser portion.

In another aspect of the invention, each anchor flange may further comprise a sub-riser-engaging tab connected to and extending from the leg portion towards the landing portion from a point separated from the baffle portion by at least the width of the riser portion. The sub-riser-engaging tab may have a width not greater than the width of the riser portion, for engaging the riser portion of a second preceding plate configured like the first, on which a first preceding plate is mounted.

The invention also provides a monolith comprising at least a first plate, a succeeding plate and a preceding plate, wherein at least the first plate and the succeeding plate comprise plates according to the present invention, and wherein the preceding plate comprises at least a support flange. On the first plate, the riser portions of the support flanges are bent at right angles to the baffle portion and the landing portions of the support flanges are bent at right angles to the riser portion to support the succeeding plate in spaced, parallel mounted relation to the first plate. The anchor flanges of the succeeding plate are bent at right angles to the baffle portion thereof and towards the first plate. The first plate is mounted on the landing portions of the supporting flanges of a preceding plate, and its anchor flanges bent at right angles to its baffle portion. Thus, the baffle portion and riser portions of the first plate together with the baffle portion of the succeeding plate define a first open-ended gas flow conduit through the monolith, and the baffle portion and riser portions of the preceding plate together with the baffle portion of the first plate define a second, open-ended gas flow conduit through the monolith, and the second gas flow conduit is disposed at right angles to the first gas flow conduit. Further, the first plate, the succeeding plate and the preceding plate define corners that are closed off by the anchor flanges of the first plate and the succeeding plate. Optionally, at least the first plate and the succeeding plate may comprise anchor flanges comprising leg portions and riser-engaging tabs attached to the leg portion and extending away from the riser-portion. The riser-engaging tab has a width not greater than the width of the riser portion of the preceding plate and engages the riser portion of the preceding plate.

Optionally, the plates and the monolith may comprise a catalytic material. In a particular embodiment, the monolith may comprise high surface area, catalytic material bearing inserts in the conduits.

As used herein and in the claims, the term "upward" is used to indicate the direction in which the riser portion of a support flange is bent out of the plane of the baffle portion of the plate. The direction in which an anchor flange is bent is, accordingly, designated "downward". The term "succeeding" is used to indicate a plate disposed "upwardly" of another and the term "preceding" is used to indicate a plate disposed "downwardly" of another. To facilitate the usage of these terms, the Figures show plates disposed with support flanges bent towards the top of the Figures.

DETAILED DESCRIPTION OF THE INVENTION AND PREFERRED EMBODIMENTS THEREOF

Figure 1A:
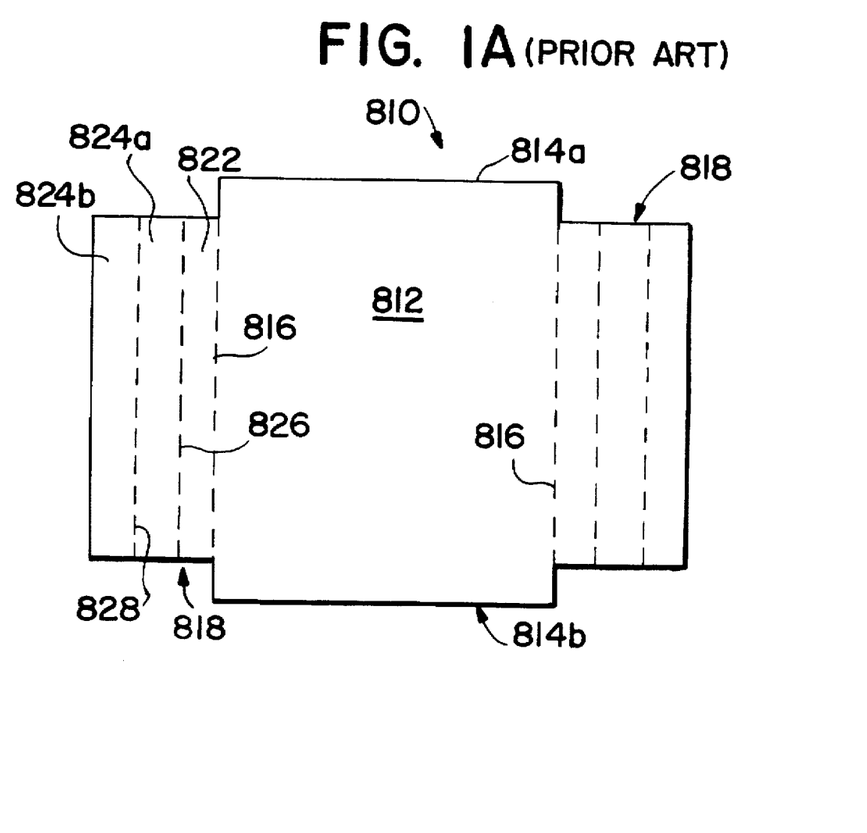
FIG. 1A is a schematic plan view of a prior art plate, with bend lines indicated thereon, used in the assembly of a monolith.
Figure 1B:
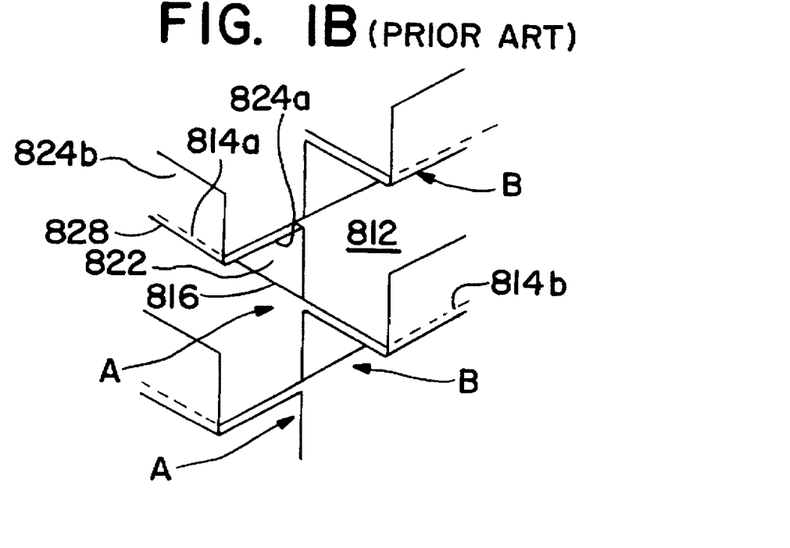
FIG. 1B is an axonometric view of the corner of a monolith assembled from plates as shown in FIG. 1A bent at the indicated bend lines.
Figure 1C:
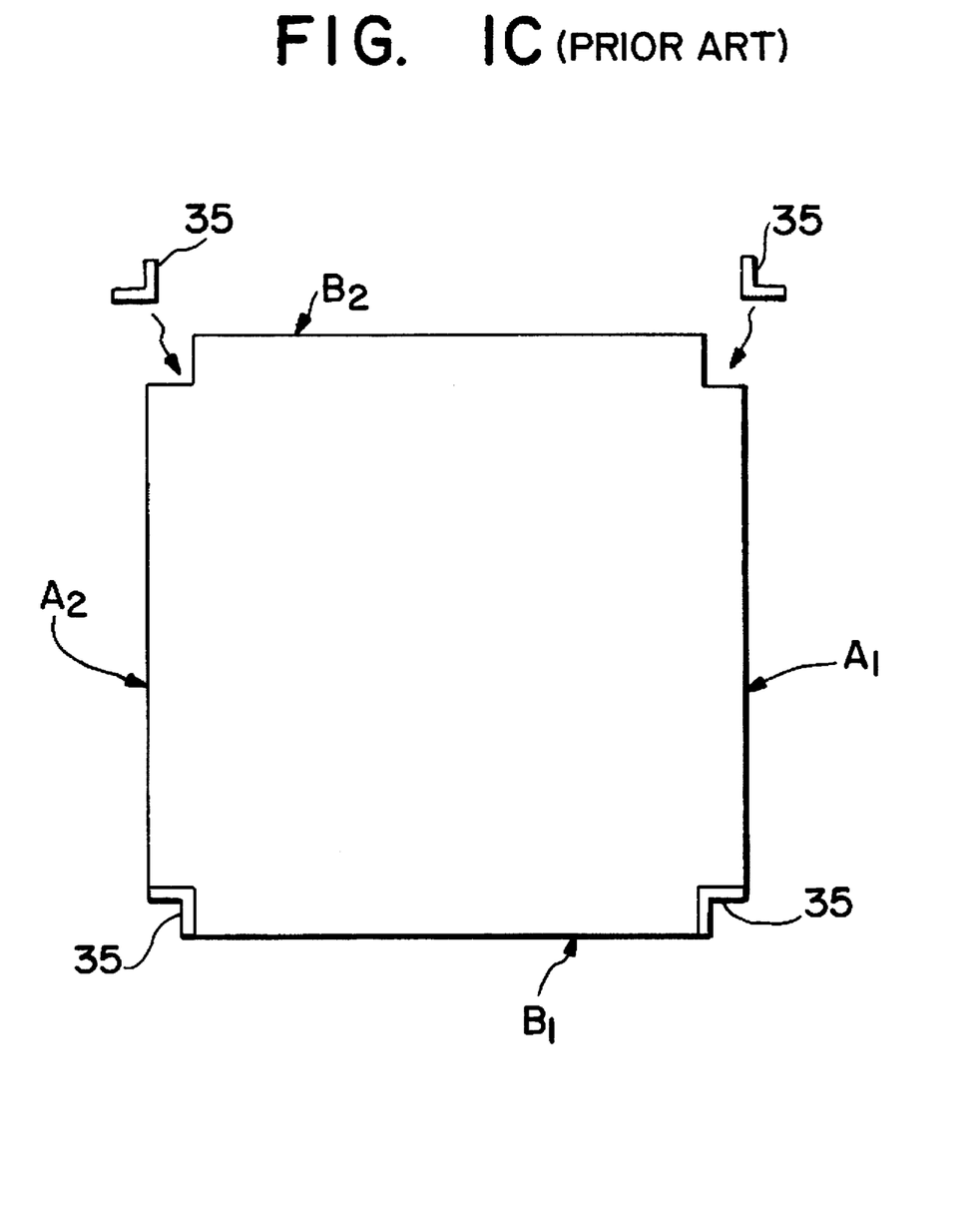
FIG. 1C is a schematic plan view of the prior art monolith of FIG. 1B.

A prior art plate used in the assembly of a conventional monolith is shown as plate 810 in FIG. 1A. Plate 810 has a baffle portion 812 which has two sides 814a and 814b and which is bordered by bend lines 816 where support flanges 818 are attached to baffle portion 812. Only one of support flanges 818 will be described in detail, since the two are similarly configured. In use, support flange 818 is bent along bend line 816 into a right angle configuration relative to baffle portion 812. Support flange 818 is then divided into three parallel portions, a riser portion 822, a landing portion 824a and an optional fold-over portion 824b by bends at bend lines 826 and 828. Initially, these bends are alternating right angle bends, so that support flange 818 has, in side view, a zig-zag configuration. A plurality of plates configured in this way can be stacked one atop the other in right angle configurations to each other, so that side edges of a second rest on the horizontal landing portion 824a of plate 810, with fold-over portions 824b still in their perpendicular, upright positions, as shown in FIG. 1B. Fold-over portions 824b may then be folded over onto the sides of the supported plate to secure the plates together. The assembled monolith defines a first plurality of gas flow passages A and a second plurality of gas flow passages B that extend at right angles to passages A. Generally, passages A extend between faces $A_1$ and $A_2$ of the monolith, shown in the schematic view of FIG. 1C, and passages B extend between faces $B_1$ and $B_2$. It will be evident from FIG. 1B that the completed monolith, in plan view, has a rectangular configuration having notched corners as shown in FIG. 1C. The corners are open so that gas flowing into contact with face A will be able to enter gas flow passages B, where a different gas stream may be flowing. To prevent the intermixing of gas streams between the separate pluralities of passages, the corners of the monolith must be closed off by securing angle members, such as members 35, to each corner of the device.

Generally, a heat exchanger monolith may be prepared in accordance with the present invention by assembling a plurality of interlocking plates, each plate being configured like the next. The assembled monolith defines two pluralities of open-ended gas flow conduits extending therethrough, the conduits being sequentially arranged and extending alternately at right angles from one to the next. The assembled monolith is rectangular in shape, and the first plurality of conduits has open ends at one pair of sides of the monolith, and a second plurality of conduits has open ends at the other sides of the monolith. Thus, a gas stream may be flowed through the first plurality of conduits in right angle or crossflow relation to a gas stream flowing through the second plurality of conduits. Preferably, the plates are formed from metal having good heat exchange properties, so that heat is easily passed through the plates from gas flowing through one plurality of conduits to gas flowing through the other.

Generally, plates in accordance with the present invention comprise a baffle region bounded by a pair of substantially straight, parallel sides. At the opposite ends of the baffle region, the plate comprises two types of flanges that are bendable out of the plane of the baffle region. The first type of flange is a support flange. Support flanges are bendable into a configuration where they can provide landings for a second plate to be held in spaced, parallel relation to the first plate. The baffle regions of the two plates and the support flanges of the first plate together define an open-ended conduit through which a gas stream may flow. Since the support flanges on the ends of the first plate engage the sides of the second plate, the second plate is disposed at right angles with respect to the first plate, and its support flanges will extend away from the first plate above the open ends of the first conduit, to support yet another, third, plate in crosswise relation to it and therefore in parallel relation to the first plate. The baffle portions of the second and third plates, together with the support flanges of the second plate, define a second open-ended conduit disposed in crosswise relation to the first conduit.

The second type of flange that forms part of a plate in accordance with the present invention is an anchor flange. Generally, anchor flanges are bendable at right angles to the baffle portion in a direction opposite to that of the support flanges, and anchor flanges serve at least to close the open corner of the assembled monolith, to eliminate the need for angle members.

Figure 2A:
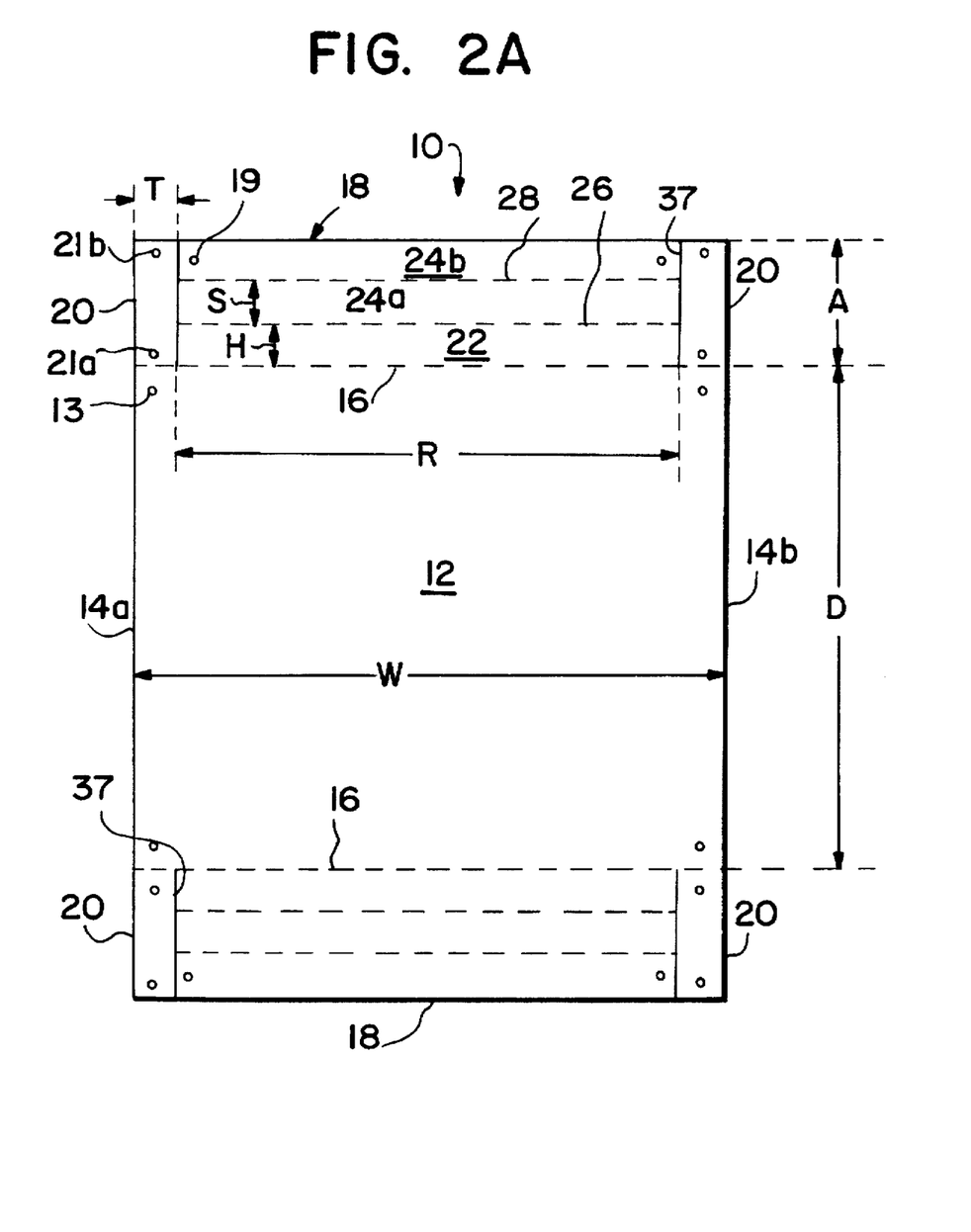
FIG. 2A is a schematic plan view of a plate according to one embodiment of the present invention, showing bend lines and bonding points.

A plate in accordance with one embodiment of the invention is shown in FIG. 2A. The plate shown in FIG. 2A is symmetric in that the flanges at one end are configured like, and function identically to, those at the other end. Accordingly, the description of the flanges of one end of the plate will apply equally to those at the other end.

Plate 10 comprises a baffle portion 12 having a pair of substantially straight, parallel sides 14a, 14b, which define the width W of baffle portion 12. The ends of baffle portion 12 are defined by bend lines 16, which are separated by a distance D which defines the length of baffle portion 12 and which is shorter than width W by an amount designated 2S. Thus, W=D+2S. A support flange 18 and anchor flanges 20 are attached to baffle portion 12 at bend line 16. Support flange 18 comprises a riser portion 22 which is attached to baffle portion 12 along bend line 16 and which has an end-toend length R which is shorter than width W by an amount designated 2T. Thus, W =R+2T. Support flange 18 also comprises a landing portion 24a which is separated from riser portion 22 by bend line 26 and has the same length as riser portion 22. Support flange 18 comprises a fold-over portion 24b that is attached to landing portion 24a along bend line 28. When support flange 18 is bent along bend line 16 to right angles with baffle portion 12, landing portion 24a can be bent into a plane parallel to that of baffle portion 12 to provide a support surface on which a similary configured plate may be mounted, at a height H above baffle portion 12 indicated in FIG. 2B. Bend line 28 is disposed at about a distance S from bend line 26. Therefore, when both support flanges 18 of plate 10 are bent into position to support another plate, the distance from the bend line 28 of one support flange to the bend line of the other support flange will be D+2S, which equals W, the width of the supported plate. The sides of the supported plate will therefore by disposed in spaced, parallel relation to the ends of the supporting plate. Plate 10 comprises a number of bonding sites 13, 19, 21a, 21b, where it can conveniently be bonded, by spot welding, riveting or other suitable methods, to other plates in the monolith.

Anchor flange 20 is attached to the end of baffle portion 12, beside each end of riser portion 22, and has a width T and extends away from baffle portion 12 for a length A which is at least twice width H of riser portion 22, and preferably greater than twice H. Anchor flange 20 is contiguous with support flange 18 along slot 37 which separates them.

Anchor flange 20 is bendable along bend line 16 so that it is disposed at right angles to, and extends away from, baffle portion 12 in a direction opposite to that of riser portion 22. The resulting configuration is shown in FIG. 2B.

Figure 2B:
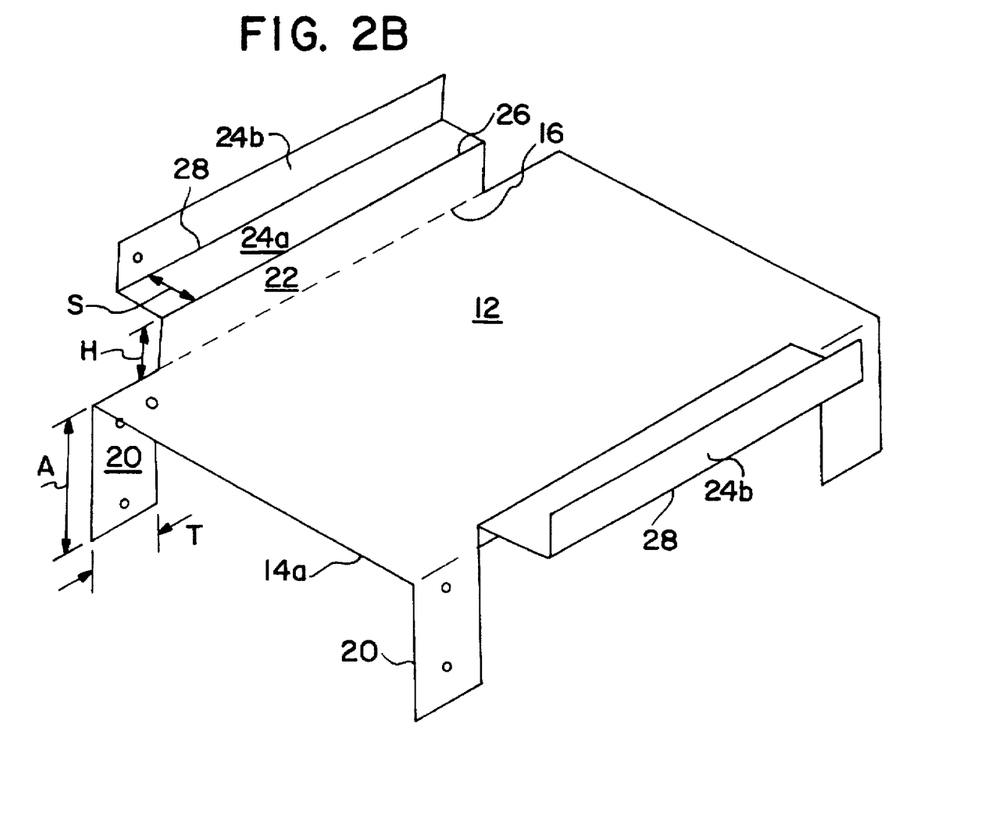
FIG. 2B is an axonometric view of the plate of FIG. 2A showing the support flanges and anchor flanges bent into shape for assembly.
Figure 2C:
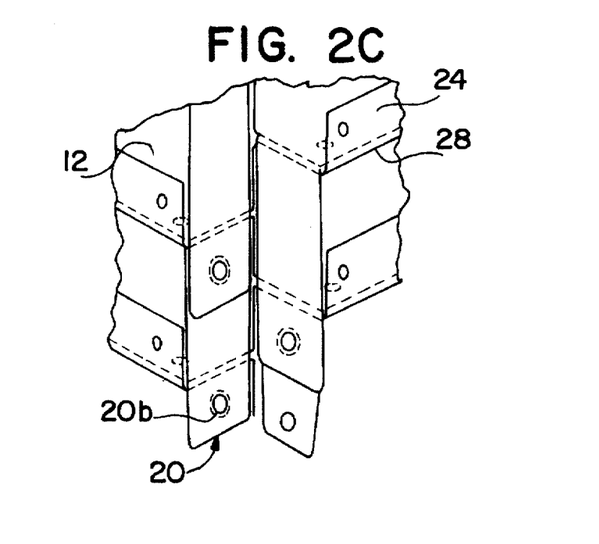
FIG. 2C is an axonometric view of the corner of a monolith assembled from a plurality of deep plates shown in FIG. 2A bent as shown in FIG. 2B, with fold over portions of the support flanges in their upright positions.

By preparing a plurality of plates as shown in FIG. 2B and disposing them one atop the other in alternating 90° relation to one another, a monolith can be assembled. One corner of such a monolith is shown in FIG. 2C, in which baffle portion 12, one side 14a and anchor flange 20, bend line 28 and a fold-over portion 24b of the plate of FIG. 2B are labeled. In FIG. 2C, it is evident that by utilizing a plate that comprises an anchor flange having a length A equal at least to twice the height H of the riser portion, the anchor flanges can be used to seal the corners of the monolith, and thus eliminate the need for the angle members needed with prior art monoliths. Preferably, the length A of the anchor flanges is long enough to permit each anchor flange to overlap the anchor flange of at least one preceding plate, to facilitate attachment of the flanges together. Optionally, the length A of the plates may vary. For example, the two uppermost plates of the monolith may be provided with anchor flanges long enough to reach to the bottom of the monolith. The remainder of the monolith could be constructed from plates according to the prior art, and the need for angle members would still be obviated. Alternatively, plates according to the present invention could be situated periodically within a monolith and may have anchor flanges long enough to extend to the anchor flange of the next plate according to the present invention. For example, two plates having anchor flanges of a length greater than 4H could be alternated in pairs with plates according to the prior art, and the anchor flanges could be long enough to close off the corner of the monolith. In such an embodiment, the top two plates would comprise plates in accordance with the present invention, the next two plates may comprise plates without anchor flanges, and the next two plates would comprise plates in accordance with the present invention, and so on. In still other embodiments, each plate may have anchor flanges long enough to reach the bottom of the monolith.

Figure 3:
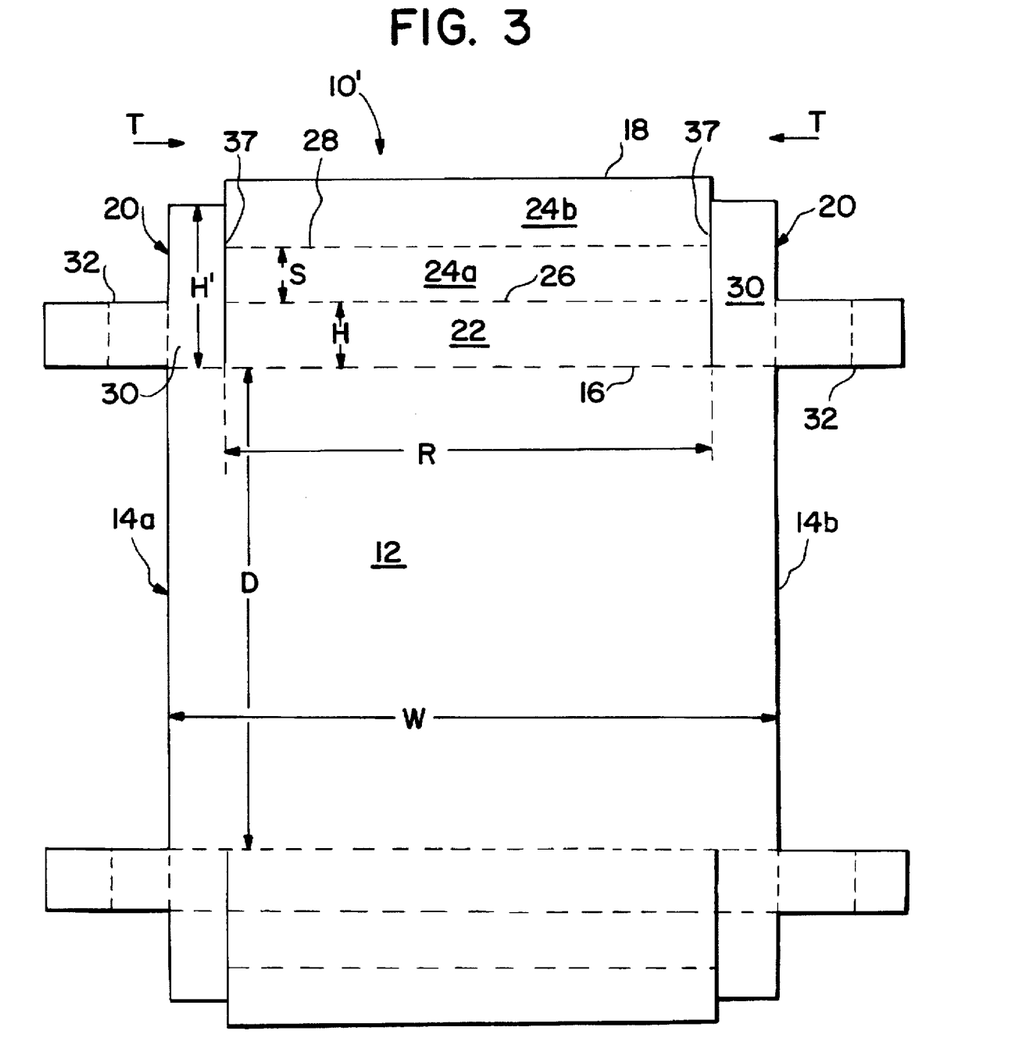
FIG. 3 is a schematic plan view of a plate according to one embodiment of the present invention useful for assembling a heat exchanger monolith.

A plate 10' according to another embodiment of the present invention is shown in FIG. 3, wherein dimensions and features corresponding to those of the embodiment of FIG. 2A are numbered identically therewith, so the configuration and function of plate 10' can be generally understood by reference to FIGS. 2A, 2B and 2C and the description associated therewith. However, in the embodiment of FIG. 3, anchor flange 20 comprises a leg portion 30 and a riser-engaging tab 32 which extends from leg portion 30 away from riser portion 22 for a distance greater than the width of leg portion 30, and is dimensioned and configured to engage the riser portion of a plate that may support plate 10', as will be described below. Riser-engaging tab 32 has a width that does not exceed, and is preferably equal to, H.

Figure 4A:
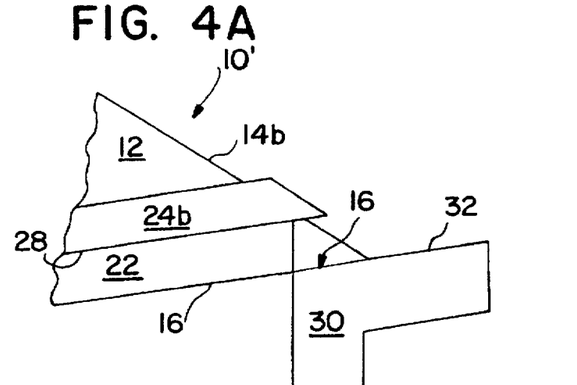
FIGS. 4A and 4B are axonometric views of one corner of the plate of FIG. 3 with the flanges thereon bent to simulate the assembly of a monolith.

In the course of assembling a monolith from plate 10', the support flanges 18 and anchor flanges 20 will be bent in mutually opposing perpendicular relation to baffle portion 12. Thus, as shown in FIG. 4A, riser portion 22 is bent upwards at flange border (bend line 16), at right angles to baffle portion 12, while leg portion 30 is bent downwards at right angles to baffle portion 12. Landing portion 24a (not visible in FIG. 4A) is bent at right angles to riser portion 22, and away from baffle portion 12, to form a landing on which the side edge of another plate may be placed. Foldover portion 24b is folded nearly 180° at bend line 28, so that a slot is formed between fold-over portion 24b and landing portion 24a into which the edge of a plate may be inserted. As will be described below, riser-engaging tab 32 will be bent over and around leg portion 30, as shown in FIG. 4B.

Figure 4B:
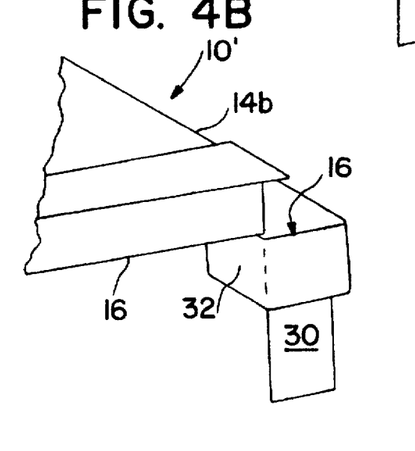
Figure 5:
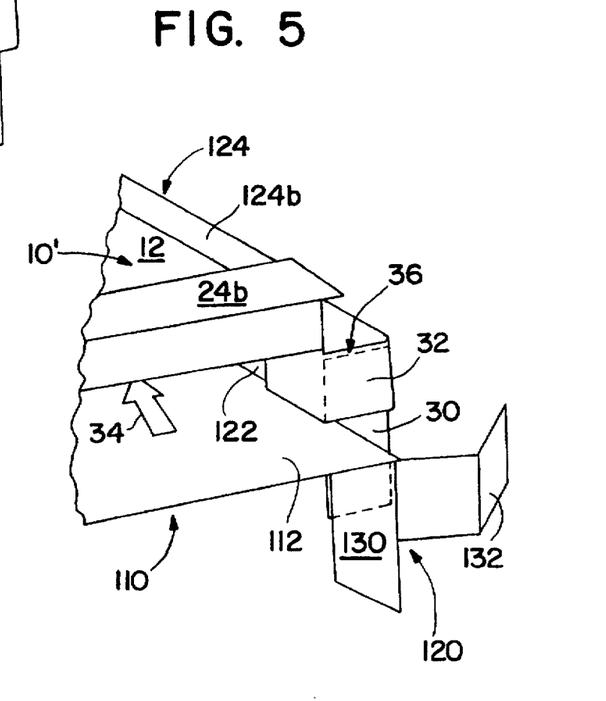
FIG. 5 is an axonometric view of the corners of two plates similar to the one of FIG. 3, held together by their respective flanges.

Plate 10', folded as in FIG. 4B, is shown in FIG. 5 mounted on a second plate 110. Plate 110 is configured identically to plate 10', and corresponding structures are labelled with corresponding numerals, except that the structures on plate 110 are three digit numbers having the numeral one (1) as the first digit, i.e., plate 10' comprises a baffle portion 12 while plate 110 comprises a baffle portion 112, etc. As shown in FIG. 5, the side 14b of plate 10' (shown in FIGS. 4A and 4B but not visible in FIG. 5) is inserted into a slot formed by fold-over portion 124b and the underlying landing portion of the support flange of plate 110 (not shown). Plate 10' may then be secured in the landing portion 124 of plate 110 by crimping, welding, soldering, riveting or any other conventional method, along landing portion 124. Landing portion 124 of plate 110 supports plate 10' above plate 110 at a height determined by the width of riser portion 122.

Riser-engaging tab 32 of plate 10' is bent over and around leg portion 30 as shown in FIG. 4B, so that it engages, i.e., lies flat against, riser portion 122 of plate 110. Plates 10' and 110 may then be secured together by crimping, welding, riveting, soldering, etc., riser-engaging tab 32 onto riser portion 122.

As indicated above, baffle portion 112, riser portions 122 and baffle portion 12 together define a conduit through which gas can flow as indicated by gas flow arrow 34. The anchor flange 120 of plate 110 is shown bent downwards at right angles to baffle portion 112, and is partially prepared to engage the riser of a supporting plate (not shown).

As will be evident from FIG. 5, as the leg portion of a first plate extends downwards, it is disposed at right angles to the leg portion of the immediately preceding plate. However, if it extends further downward, it will engage the leg portion of the second preceding plate. Thus, the lower end of leg portion 30 could be inserted into a slot between the riser-engaging tab and the leg portion of the second preceding plate (not shown) corresponding to slot 36 formed between the riser-engaging tab 32 and the leg portion 30 of plate 10'. Likewise, the downward extending leg portion of the second succeeding plate 310 to plate 10' can be inserted into slot 36, as shown in FIGS. 6A and 6B.

Figure 6A:
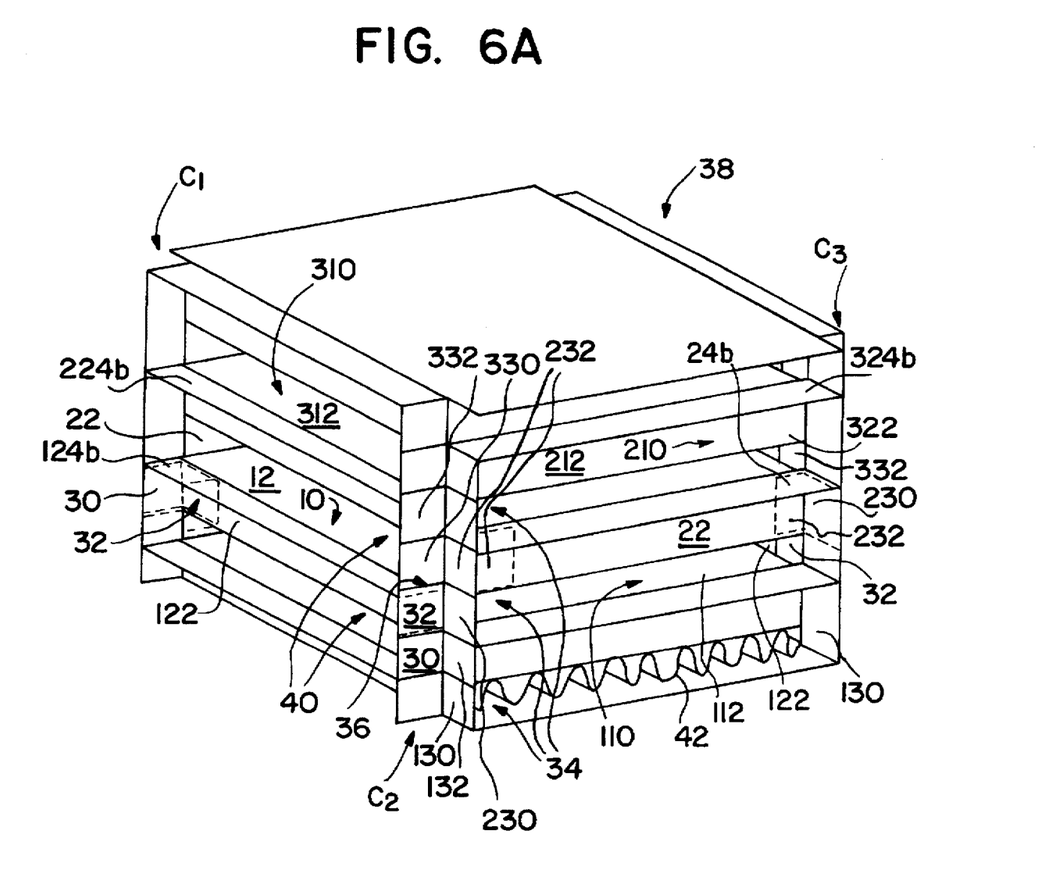
FIG. 6A is an axonometric view of an assembled monolith comprising a plurality of plates as shown in FIG. 3.
Figure 6B:
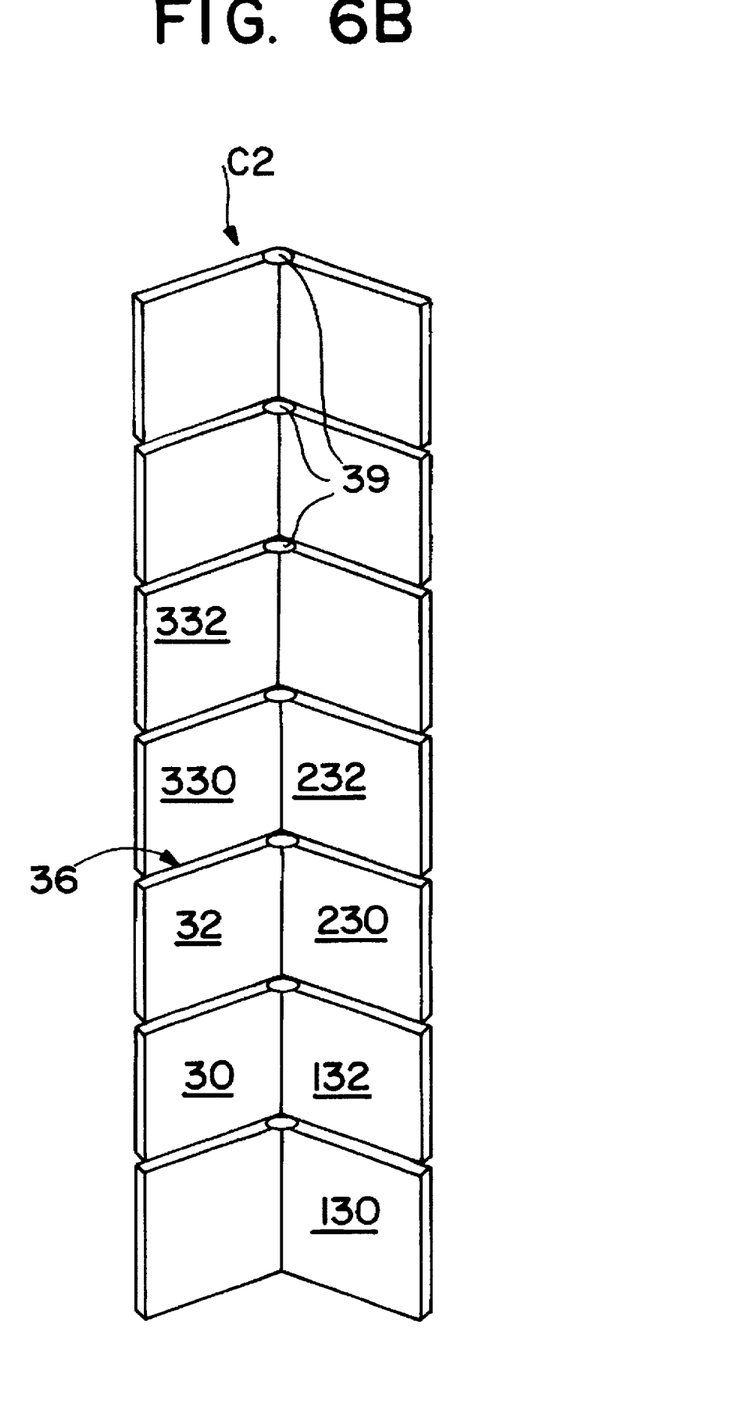
FIG. 6B is an axonometric view similar to, but enlarged with respect to, FIG. 6A, of corner C2 of the monolith of FIG. 6.

FIG. 6A shows a monolith assembled using a plurality of plates as shown in FIG. 3 which are interconnected as shown in FIG. 5. In the monolith of FIG. 6A, plates 10' and 110 of FIG. 5 are disposed in the interior of monolith 38 and their respective baffle portions 12, 112, riser portions 22, 122, fold-over portions 24b, 124b are shown. Leg portions 30 of plate 10' are visible in corners C1 or C2 of monolith 38, while a small portion of riser-engaging tab 32 is visible at corner C3. In corner C1, riser-engaging tab 32 is seen in dotted outline folded over and around leg portion 30 and in engagement with riser portion 122. At corner C2, shown in large scale in FIG. 6B, the fold-over portion of riser-engaging tab 32 is directly visible, but the portion that engages riser portion 122 is hidden from view. Also visible in corner C2 is a leg portion 230 and the folded over part of a riser-engaging tab 232 which is seen in dotted outline in FIG. 6A engaging riser portion 22. In addition, it can be seen in corner C2 that a leg portion 330 of the second plate 310 above plate 10' extends downward past plate 110 and is received in slot 36 formed by riser-engaging tab 32.

The monolith so constructed has a first plurality of open-ended gas flow conduits 34 and a second plurality of open-ended gas flow conduits 40 disposed in crosswise relation to first plurality 34. In a monolith such as monolith 38, the supporting flanges of the top plate will, of course, not be used and may therefore be at least partially cut off from the plate. Preferably, the riser portion of the top plate is retained and is not bent out of the plane of the baffle portion. If they are not removed, the landing portion and the attached fold-over portion can be folded flat against the plate. Thus, the edges of the top plate are square with the sides of the monolith. Similarly, the anchor flanges of the bottom plate are of no use, and may be removed at the flange border (bend line 16) or may be folded upward in engagement with a succeeding plate.

The various plates of monolith 38 are secured together, preferably by welding, so that the plates do not allow gas to flow between the conduits or to escape the monolith except from the open ends of the conduits. Due to the unique structure of such a monolith, it may be securely held together by spot welds at the corner points 39 shown in FIG. 6B. Monolith 38 may be mounted in a housing providing convenient inlet and outlet manifolds that will guide a first and second gas stream through the respective pluralities of conduits to achieve heat exchange. Optionally, such a monolith may be coated with catalytic material and used as a catalytic converter. In such case, monolith 38 may be mounted in a housing having appropriate inlet and outlet manifolds and an appropriate transfer manifold so that the inlet gas enters through conduits 34, then through the transfer conduit and then through conduits 40, and then to the outlet manifold. Optionally, monolith 38 may be coated with a catalytic material effective to treat gaseous components of the gas streams flowing therethrough. This may be accomplished by immersing monolith 38 in a slurry of the catalytic material, and then drying and calcining the monolith to leave a washcoat of catalytic material thereon. Alternatively, the plates may be coated with catalytic material before the monolith is assembled. To increase the catalytically active surface area contacted by the gas in the monolith, the conduits, e.g., conduits 34 and 40, may be filled with high surface area carriers such as honeycomb inserts or corrugated sheets having catalytic material deposited thereon, such as insert 42. Thus, monolith 38 may be used in a particular embodiment as a catalytic heat exchange member capable of converting noxious components of an automotive exhaust gas stream such as $NO_x$, CO and hydrocarbons to innocuous substances such as $N_2$, $CO_2$ and $H_2O$. For this purpose, the catalytic material comprises a conventional three-way catalyst, which is known in the art to comprise platinum group metals such as Pt, Pd and Rh dispersed on a refractory oxide support material. The slurry used to coat the monolith comprises particles of the support material onto which the platinum group metals have been dispersed. The catalytic process occurring in one set of gas flow passages can be accelerated by heat exchange with gas flowing through the second set of gas flow passages.

Figure 7:
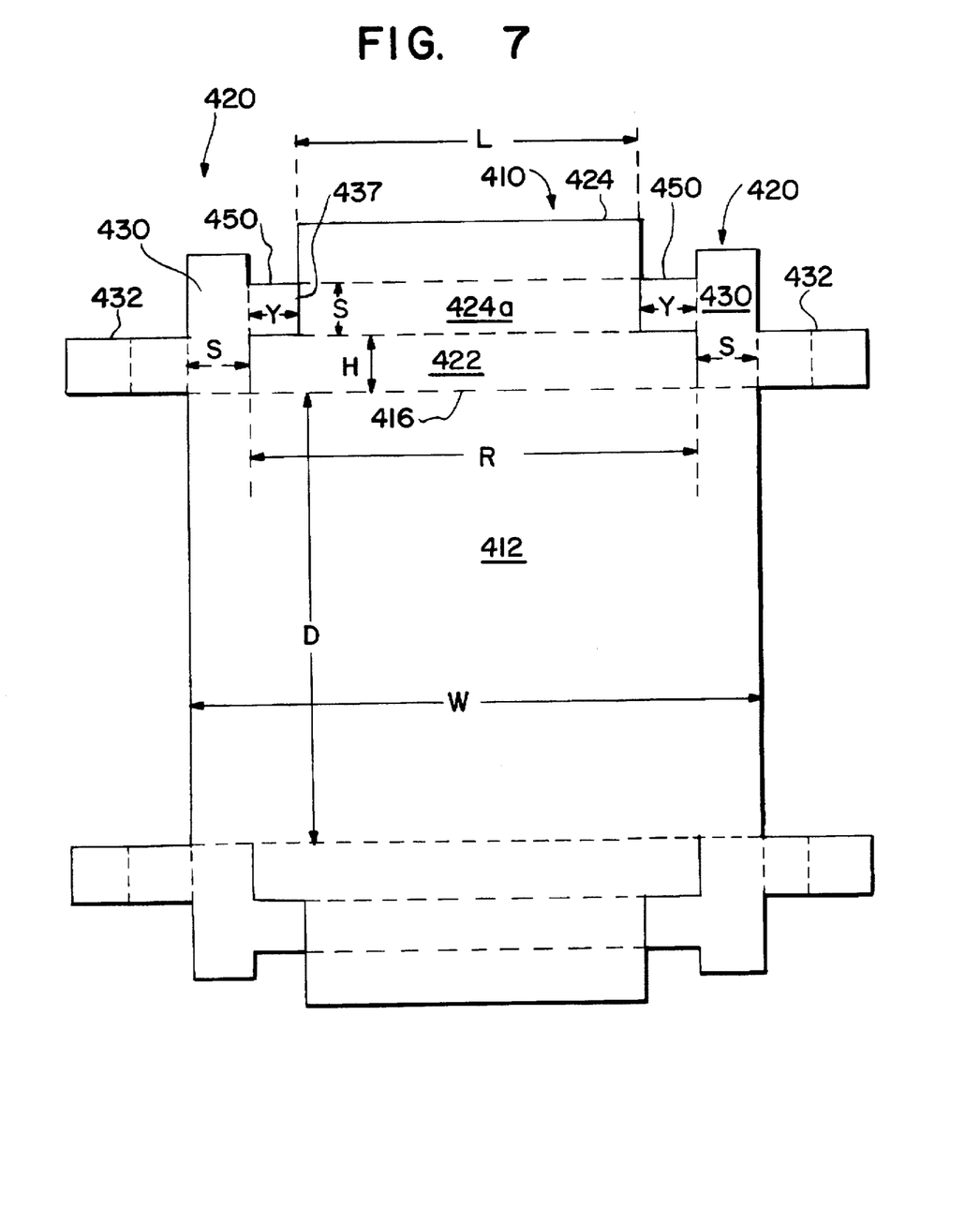
FIG. 7 is plan view of a plate in accordance with a second embodiment of the present invention.

A plate according to a second embodiment of the present invention is shown in FIG. 7. Plate 410 is generally similar to plate 10' of FIG. 4, so the structures thereon are accorded similar indicator numerals, the indicator numerals for plate 410 being preceeded by the number 4.

Like plate 10', plate 410 comprises riser-engaging tabs 432 which, when leg portions 30 are folded downward, can be manipulated to engage the riser portion of the immediately preceding plate that is supporting plate 410. However, while the landing portion of plate 10' has the same length as the riser portion, the length L of landing portion 424a is less than riser portion 422 by an amount designated 2Y. Thus, R=L+2Y. In addition, the anchor flanges 420 of plate 410, unlike those of plate 10', comprise sub-riser-engaging tabs 450 which extend from leg portion 430 towards landing portion 424a from a point at a distance of at least H from the flange border (bend line 416) and for a length preferably sufficient to meet the end of landing portion 424a. Thus, the sub-riser-engaging tab 450 may be contiguous with both landing portion 424a and riser portion 422, along the slot 437 that separates them. Preferably, the length of each sub-riser-engaging tab 450 is equal to Y and its width is equal to H. Plate 410, like other plates according to the present invention, can be formed by stamping or cutting sheet metal to establish the periphery and the slots that define the sides and flanges of the plate.

Figure 8A:
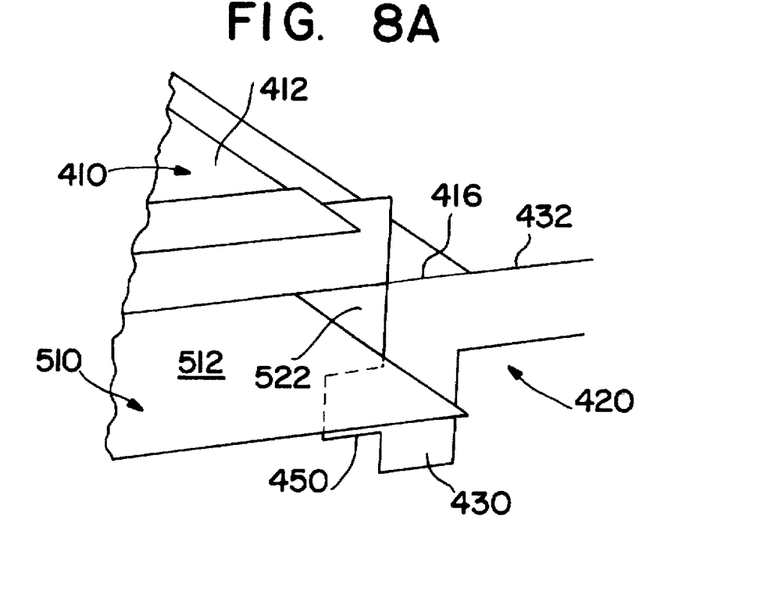
FIG. 8A is an axonometric view of a corner of the plate of FIG. 7 with its anchor flange bent down and supported by a preceding plate with its anchor flange removed to simplify the Figure.
Figure 8B:
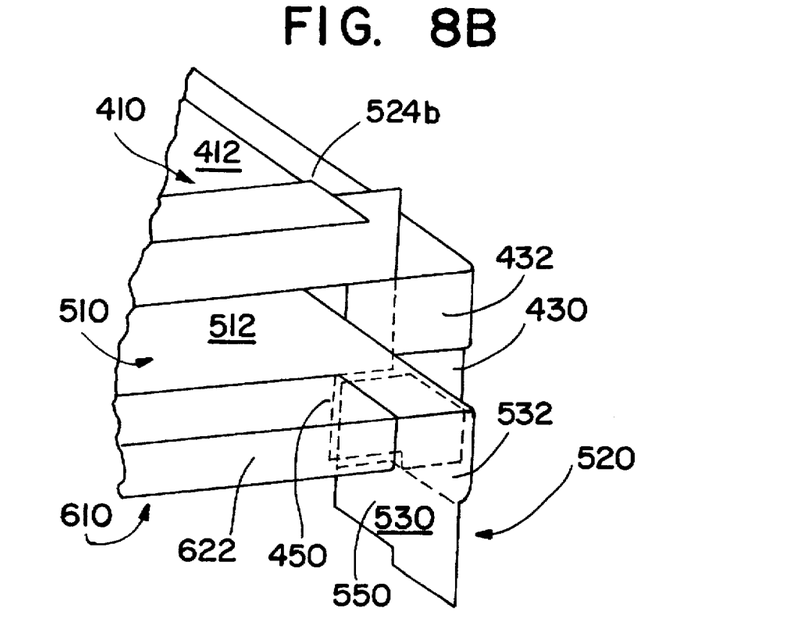
FIG. 8B is an axonometric view of the plates of FIG. 8A supported by a third plate whose anchor flange is removed to simplify the Figure, showing the riser-engaging tab and sub-riser-engaging tab of the top plate engaging the riser portions of the two preceding plates.

When leg portions 430 are folded down beneath baffle portion 412, sub-riser-engaging tabs 450 can be inserted into the conduit defined by the first preceding plate and the next preceding plate, where they will engage the riser portion of the second preceding plate. Thus, in a monolith comprising plates as shown in FIG. 7, the anchor flanges of each plate will engage the riser portions of the two plates immediately beneath it. Thus, each riser portion (except for the top two) will be engaged by a riser-engaging tab of its first succeeding plate and a sub-riser-engaging tab of the next succeeding plate. As shown in FIG. 8A, anchor flange 420 is bent downward, and riser-engaging tab 432 is dimensioned and configured to be bent around leg portion 430 to engage riser portion 522 of the immediately preceding plate that supports plate 410 by being inserted into the conduit defined by baffle portion 412, the baffle portion 512 of the preceding plate and riser portions 522 (only one of which is shown). Sub-riser-engaging tab 450 is shown beneath the immediately preceding plate 510, the anchor flange of which is omitted from FIG. 8A for clarity, but is shown in FIG. 8B. Riser-engaging tab 532, shown in FIG. 8B in dotted outline, is bent over and around leg portion 530, and is inserted into the conduit defined in part by riser portion 622 of the second preceding plate to plate 410, to engage both riser 622 and sub-riser-engaging tab 450. To simplify the Figure, the anchor flange of plate 610 is not shown. The sub-riser-engaging tab 550 of first preceding plate 510 is seen extending beneath plate 610, in position to engage the riser portion together with the sub-riser-engaging tab of plate 610.

Figure 9:
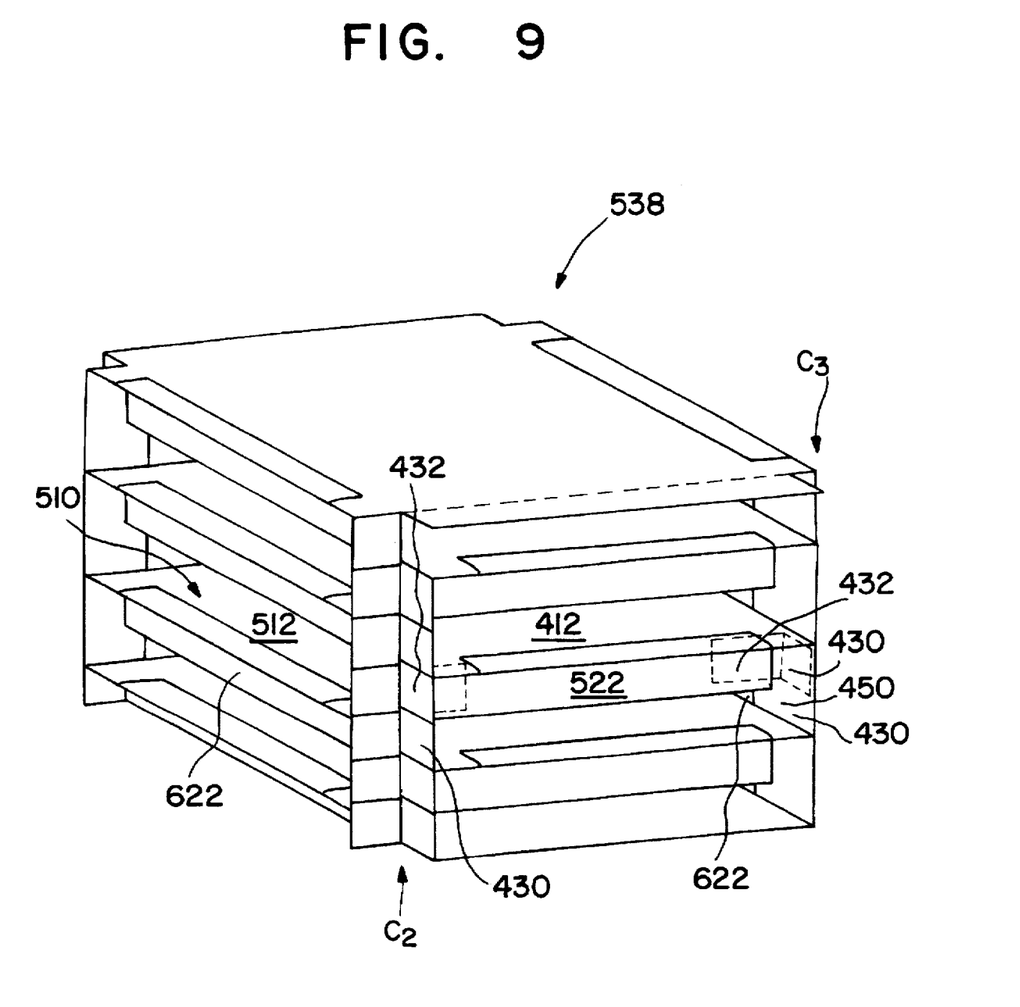
FIG. 9 is an axonometric view of a monolith comprising a plurality of plates as shown in FIG. 7.

A monolith comprising plates as shown in FIG. 7, linked together as shown in FIG. 8B, is illustrated in FIG. 9, wherein plate 410 is centrally disposed. In corner C2, the exterior portion of riser-engaging tab 432 is seen folded over leg portion 430 and is seen in dotted outline engaging riser portion 522 of the immediately preceding plate. The sub-riser-engaging tab attached to leg portion 430 engages riser portion 622, but is not visible. Similarly, in corner C3, riser-engaging tab 432 is shown, entirely in dotted outline, folded over leg portion 430 to engage riser portion 522. However, sub-riser-engaging tab 450 is visible extending beneath baffle portion 512 and engaging riser portion 622 of the plate supporting plate 510.

While the invention has been described in detail with respect to specific preferred embodiments thereof, it is to be understood that upon a reading of the foregoing description, variations to the specific embodiments disclosed may occur to those skilled in the art and it is intended to include such variations within the scope of the appended claims.

What is claimed is:

1. A first plate used in the assembly of a monolith, the first plate comprising:

a central baffle portion having two sides and two ends;

a support flange attached to each end of the first plate for supporting a succeeding plate in parallel, spaced relation to the first plate; and anchor flanges attached to each end of the first plate for closing off the corner of a monolith comprising the plate.

2. The plate of claim 1 wherein each support flange comprises a riser portion having two sides and being attached on one side to an end of the baffle portion, and a landing portion attached to the other side of the riser portion; and wherein each anchor flange extends from the baffle portion therefrom for a length equal to at least twice the width of the riser portion.

3. The plate of claim 2 wherein the anchor flange further comprises a leg portion and a riser-engaging tab extending from the leg portion in a direction perpendicular to the side of the plate for engaging the riser portion of a preceding plate support flange on which the first plate may be mounted.

4. The plate of claim 3 further comprising a sub-riser-engaging tab attached to the leg portion and extending therefrom for engaging the riser portion of the support flange of a second preceding plate on which the preceding plate is mounted.

5. The plate of claim 1 comprising a catalytic material coated thereon.

6. A bendable first plate used in the assembly of a monolith comprising, in its flat configuration:

a generally rectangular central baffle portion having a width defined by a pair of generally straight, parallel side edges and being mounted on the ends by a flange border;

a support flange at each end of the baffle portion, each support flange comprising a riser portion and a landing portion, the riser portion having two sides and two ends and being attached on one side to the baffle portion at the flange border, and being bendable to a substantially perpendicular relationship with the baffle portion, the landing portion being attached to the other side of the riser portion and being bendable to be substantially parallel to the baffle portion, for supporting a succeeding plate configured like the first plate, the end-to-end length of the riser portion being less than the width of the baffle portion, and the riser portion being disposed centrally between the side edges of the baffle portion; and a pair of anchor flanges attached to each end of the baffle portion beside each end of the riser portions, each anchor flange being contiguous with the support flange and being bendable to a substantially perpendicular relationship with the baffle portion in a direction opposite to that of the riser portion and having a width equal to about one-half the difference between the end-to-end length of the riser portion and the width of the baffle portion for at least partially closing off the corners of a monolith comprising the plate.

7. The plate of claim 6 wherein each anchor flange comprises (i), a leg portion for at least partially closing off the corner of a monolith comprising the plate, and (ii), a riser-engaging tab attached to and extending from the leg portion away from the riser portion, the riser-engaging tab having a width not greater than the width of the riser portion, the riser-engaging tab having a length greater than the width of the leg portion, for engaging the riser portion of a preceding plate configured like the first plate, on which the first plate is mounted.

8. The plate of claim 7 wherein the width W of the baffle portion exceeds the length R of each riser portion by an amount designated 2T, and wherein the width of each leg portion equals T, and wherein the width W of the baffle portion exceeds the length D of the baffle portion by an amount designated 2S, and wherein the width of each riser portion equals S.

9. The plate of claim 7 wherein the leg portion has a length greater than twice the width of the riser portion.

10. The plate of claim 7, claim 8 or claim 9 wherein each anchor flange further comprises a sub-riser-engaging tab connected to and extending from the leg portion towards the landing portion from a point separated from the baffle portion by at least the width of the riser portion, the sub-riser-engaging tab having a width not greater than the width of the riser portion, for engaging the riser portion of a second preceding plate configured like the first plate, on which a first preceding plate is mounted.

11. The plate of claim 7 further comprising a catalytic material coated thereon.

12. A monolith comprising at least a first plate, a succeeding plate and a preceding plate, at least the first plate and the succeeding plate being described in any one of claim 1, claim 6 or claim 8, and the preceding plate comprising at least a support flange wherein on the first plate, the riser portions of the support flanges are bent at right angles to the baffle portion and the landing portions of the support flanges are bent at right angles to the riser portions, to support the succeeding plate in spaced, parallel, mounted relation to the first plate;

the anchor flanges of the succeeding plate being bent at right angles to the baffle portion thereof towards the first plate; and the first plate being mounted on landing portions of the supporting flanges of the preceding plate and having its anchor flanges at right angles to its baffle portion;

whereby the baffle portion and riser portions of the first plate together with the baffle portion of the succeeding plate define a first open-ended gas flow conduit through the monolith; and whereby the baffle portion and riser portions of the preceding plate together with the baffle portion of the first plate define a second, open-ended gas flow conduit through the monolith, the second gas flow conduit being disposed at right angles to the first gas flow conduit; and whereby the corners of the monolith defined by the first plate, the succeeding plate and the preceding plate are closed off by the anchor flanges of the first plate and the succeeding plate.

13. The monolith of claim 12 wherein each anchor flange comprises a leg portion and a riser-engaging tab attached to the leg portion and extending away from the support flange, for engaging the riser portion of a preceding plate, the riser-engaging tab having a width not greater than the width of the riser portion of the support flange.

14. The monolith of claim 13 further comprising high surface area catalytic material-bearing inserts in the conduits.

15. The monolith of claim 13 further comprising a catalytic material coated thereon.

* * * * *